United States Patent
Trachtman

(10) Patent No.: US 10,013,537 B1
(45) Date of Patent: Jul. 3, 2018

(54) VARYING THE AMOUNT OF TIME THAT A MOBILE DEVICE MUST BE INACTIVE BEFORE THE MOBILE DEVICE RE-LOCKS ACCESS TO A COMPUTERIZED RESOURCE

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 15/086,519

(22) Filed: Mar. 31, 2016

(51) Int. Cl.
*G06F 21/31* (2013.01)

(52) U.S. Cl.
CPC .................... *G06F 21/31* (2013.01)

(58) Field of Classification Search
CPC ........................................................ G06F 21/31
See application file for complete search history.

(56) References Cited

U.S. PATENT DOCUMENTS

| | | | |
|---|---|---|---|
| 9,319,845 B1 | 4/2016 | Rownin | |
| 9,324,121 B2 | 4/2016 | Osann, Jr. | |
| 9,324,149 B2 | 4/2016 | Wigton | |
| 9,363,734 B2 | 6/2016 | Rajeevalochana | |
| 9,373,257 B2 | 6/2016 | Bonhomme | |
| 9,374,423 B2 | 6/2016 | Crosbie et al. | |
| 2010/0175116 A1 | 7/2010 | Gum | |
| 2011/0228753 A1* | 9/2011 | Polito | G01S 5/0221 370/338 |
| 2012/0174237 A1* | 7/2012 | Krzyzanowski | G06F 21/70 726/29 |
| 2013/0169434 A1 | 7/2013 | McCown et al. | |
| 2013/0194067 A1* | 8/2013 | Kimbrell | G06F 21/31 340/5.54 |
| 2015/0356289 A1 | 12/2015 | Brown et al. | |
| 2017/0085565 A1* | 3/2017 | Sheller | H04L 63/0876 |

OTHER PUBLICATIONS

Trachtman, "Controlling Access to a Computerized Resource of a Mobile Device Based on Whether the Mobile Device Is Within a Vehicle That Is Currently Moving", U.S. Appl. No. 15/086,514, filed Mar. 31, 2016.

* cited by examiner

*Primary Examiner* — Morshed Mehedi
(74) *Attorney, Agent, or Firm* — BainwoodHuang

(57) ABSTRACT

A technique controls access to a computerized resource of a mobile device (e.g., a smart phone, a tablet, a laptop computer, etc.). The technique involves sensing, by processing circuitry, a set of environmental factors from a particular environment of the mobile device when the mobile device unlocks the computerized resource in response to successful authentication of a user. The technique further involves selecting, by the processing circuitry, an expiration time based on the set of environmental factors. The technique further involves configuring, by the processing circuitry, an inactivity timer to re-lock access to the computerized resource of the mobile device when the inactivity timer identifies a time period of mobile device inactivity that reaches the selected expiration time. Along these lines, this time period may be relatively long in a trusted environment (e.g., an hour, several hours, etc.), but relatively short in an untrusted environment (e.g., a few minutes).

20 Claims, 5 Drawing Sheets

VARYING THE AMOUNT OF TIME THAT A MOBILE DEVICE MUST BE INACTIVE BEFORE THE MOBILE DEVICE RE-LOCKS ACCESS TO A COMPUTERIZED RESOURCE

BACKGROUND

A conventional smart phone requires a human to enter a correct password (e.g., an expected sequence of numbers) before unlocking the touch screen. Once the human enters the correct password, the touch screen of the smart phone unlocks, and the human is able to operate the smart phone (e.g., the human is able to make a cellular call, launch and operate apps, etc.).

Once the touch screen is unlocked, the smart phone monitors touch screen activity and automatically re-locks the touch screen if the touch screen remains inactive for a predefined period of time (e.g., five minutes). As a result, if the human leaves the smart phone unattended for that period of time, the smart phone automatically re-locks the touch screen rather than allow the smart phone to remain in the unlocked state where it would be vulnerable to a malicious person.

SUMMARY

Unfortunately, there are deficiencies to the above-described conventional smart phone which automatically re-locks the touch screen if the touch screen remains inactive for a predefined period of time. Along these lines, a particular human that feels that it is extremely inconvenient to re-enter a correct password may manually adjust the inactivity setting of the smart phone (i.e., the predefined period of time of inactivity before the touch screen re-locks) to be relatively long such as one hour, or perhaps disable the password requirement altogether. In this situation, the smart phone is more vulnerable (e.g., the likelihood that the smart phone will be used by an unauthorized human is now higher if the smart phone is left unattended).

However, another human that is less bothered by having to re-enter a password may manually adjust the inactivity setting of the smart phone to be relatively short such as two minutes or less. Although in this situation the human is less bothered, the requirement of forcing the human to re-enter the correct password after every two minutes of inactivity (or less) may be extremely burdensome and time consuming.

In contrast to the above-described conventional smart phone which simply re-locks the touch screen if the smart phone remains inactive for a static predefined period of time, improved techniques are directed to varying the amount of time a mobile device must be inactive before the mobile device re-locks access to a computerized resource. In particular, selection of this amount of time is based on a set of environmental factors sensed from an environment of the mobile device. Along these lines, the mobile device may allow for a relatively long time period of inactivity before re-locking if the mobile device is in a highly trusted environment (e.g., in the authorized user's home at night, on the authorized user's desk during work hours, etc.). Additionally, the mobile device may allow for a relatively short time period of inactivity before re-locking if the mobile device is in an unsafe environment (e.g., in an unrecognized public setting, in a moving vehicle of an unknown geolocation, etc.). Such operation enables the mobile device to automatically and transparently adapt the inactivity time period so that the computerized resource is protected and the authorized user is not unnecessarily burdened.

One embodiment is directed to a method of controlling access to a computerized resource of a mobile device (e.g., a smart phone, a tablet, a laptop computer, etc.). The method includes sensing, by processing circuitry, a set of environmental factors from a particular environment of the mobile device when the mobile device unlocks the computerized resource in response to successful authentication of a user. The method further includes selecting, by the processing circuitry, an expiration time based on the set of environmental factors. The method further includes configuring, by the processing circuitry, an inactivity timer to re-lock access to the computerized resource of the mobile device when the inactivity timer identifies a time period of mobile device inactivity that reaches the selected expiration time. Such operation may be automatic and transparent thus enabling the user to enjoy security which adapts to the environment as well as mobile device ease of use.

In some arrangements, selecting the expiration time based on the set of environmental factors includes choosing, as the selected expiration time, a particular predefined time from multiple selectable predefined times. Such selectable predefined times may be stored in a memory of the mobile device (or computed/derived using an algorithm, formula, applied policy, combinations thereof, etc.). Alternatively, such selectable predefine times may be stored (or computed/derived) in an external authentication server.

In some arrangements, configuring the inactivity timer to re-lock access to the computerized resource includes starting the inactivity timer. Here, the inactivity timer, upon being started, (i) counts from an initial value to a predefined timeout value as a measure of a current amount of inactivity time, and (ii) provides a re-lock signal when the inactivity timer reaches the predefined timeout value.

In some arrangements, the method further includes resetting the inactivity timer to the initial value to restart the inactivity timer in response to user activity detected by the mobile device. Such resetting of the inactivity timer may occur again and again in response to detected user activity.

In some arrangements, the method further includes receiving the re-lock signal from the inactivity timer in response to the inactivity timer reaching the predefined timeout value, and re-locking access to the computerized resource in response to the re-lock signal. Here, once the inactivity timer reaches the predefined timeout value, the mobile device re-locks, and the computerized resource is secure.

In some arrangements, the method further includes, after the inactivity timer is started and before the inactivity timer reaches the predefined timeout value, sensing a new set of environmental factors from a new environment of the mobile device. In these arrangements, the method further includes selecting a new expiration time based on the new set of environmental factors, and re-configuring the inactivity timer to re-lock access to the computerized resource of the mobile device when the inactivity timer reaches a new predefined timeout value corresponding to the new expiration time.

In some arrangements, selecting the new expiration time based on the new set of environmental factors includes choosing, as the new expiration time, a new predefined time from the multiple selectable predefined times. The new predefined time may be different from the particular predefined time. Additionally, re-configuring the inactivity timer to re-lock access to the computerized resource includes directing the inactivity timer to measure the new expiration time in place of the selected expiration time and then re-starting the inactivity timer.

In some arrangements, the method further includes, after the inactivity timer is restarted, detecting new user activity and re-starting the inactivity timer in response to the new user activity. The method further includes receiving the re-lock signal from the inactivity timer in response to the inactivity timer measuring a time period of mobile device inactivity that reaches the new expiration time, and re-locking access to the computerized resource in response to the re-lock signal.

In some arrangements, choosing the new predefined time includes selecting, as the new predefined time, a time that is longer than the particular predefined time based on the new set of environmental factors indicating that the new environment is more trusted than the particular environment. Accordingly, the user is less burdened when the mobile device is in a safer environment.

In some arrangements, choosing the new predefined time includes selecting, as the new predefined time, a time that is shorter than the particular predefined time based on the new set of environmental factors indicating that the new environment is less trusted than the particular environment. Accordingly, the mobile device is better protected when in the less trusted environment.

In some arrangements, sensing the new set of environmental factors from the new environment of the mobile device includes detecting that the mobile device is within a predefined range of a previously recognized external element. Examples of previously recognized external elements include an authorized wireless network, a known geolocation, a known vehicle, range of a radio frequency (RF) beacon (including Bluetooth), a recognized human, recognized noises, and so on.

In some arrangements, the determination of an expiration time is based on a combination of environmental factors and non-environmental factors. Example non-environmental factors include time of day, day of the week, user behavior, and so on. Some factors may be obtained transparently from the user (e.g., a biometric).

Another embodiment is directed to an electronic apparatus which includes memory and control circuitry coupled to the memory. The memory stores instructions which, when carried out by the control circuitry, cause the control circuitry to:
  (A) sense a set of environmental factors from a particular environment of a mobile device when the mobile device unlocks a computerized resource in response to successful authentication of a user;
  (B) select an expiration time based on the set of environmental factors; and
  (C) configure an inactivity timer to re-lock access to the computerized resource of the mobile device when the inactivity timer identifies a time period of mobile device inactivity that reaches the selected expiration time.

Yet another embodiment is directed to a computer program product having a non-transitory computer readable medium which stores a set of instructions to control access to a computerized resource of a mobile device. The set of instructions, when carried out by computerized circuitry, causing the computerized circuitry to perform a method of:
  (A) sensing a set of environmental factors from a particular environment of a mobile device when the mobile device unlocks a computerized resource in response to successful authentication of a user;
  (B) selecting an expiration time based on the set of environmental factors; and
  (C) configuring an inactivity timer to re-lock access to the computerized resource of the mobile device when the inactivity timer identifies a time period of mobile device inactivity that reaches the selected expiration time.

It should be understood that, in the cloud context, certain electronic circuitry (e.g., a resource server, an authentication server, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in automatically and transparently varying the amount of time that a mobile device must be inactive before re-locking access to a computerized resource.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to varying an amount of time that a mobile device must be inactive before the mobile device re-locks access to a computerized resource. In particular, selection of this amount of time is based on a set of environmental factors sensed from an environment of the mobile device. In particular, the mobile device may allow for a relatively long time period of inactivity before re-locking if the mobile device is in a highly trusted environment (e.g., in the authorized user's home at night, on the authorized user's desk during work hours, etc.). Furthermore, the mobile device may allow for a relatively short time period of inactivity before re-locking if the mobile device is in an unsafe environment (e.g., in an unrecognized public setting, in a moving vehicle that is traveling in an unfamiliar geolocation, etc.). Such operation enables the mobile device to automatically and transparently adapt the inactivity time period so that the computerized resource is well protected and the authorized user is not unnecessarily inconvenienced.

Figure 1:
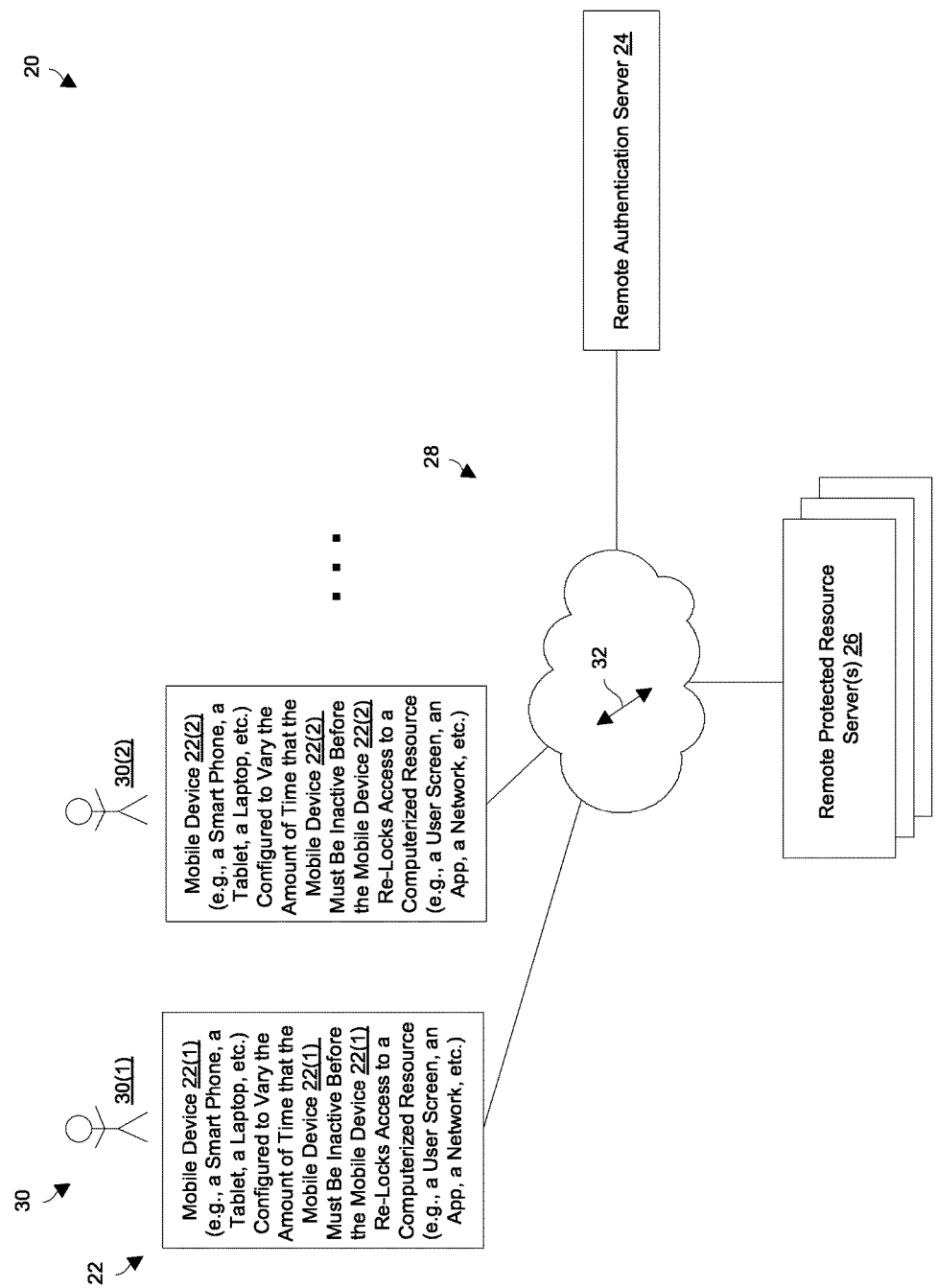
FIG. 1 is a block diagram of an electronic environment which supports controlling access to computerized resources of mobile devices.

FIG. 1 shows an electronic environment 20 which is suitable for varying amounts of time that the mobile devices must be inactive before the mobile devices re-lock access to computerized resources. The electronic environment 20 includes mobile devices 22(1), 22(2), . . . (collectively, mobile devices 22), a remote authentication server 24, a set of remote protected resource servers 26, and a communications medium 28.

Each mobile device 22 is constructed and arranged to control access to a set of computerized resources on behalf of a respective user 30 so that the user 30 is able to perform useful work. Along these lines, the mobile device 22(1) controls access for a user 30(1), the mobile device 22(2) controls access for another user 30(2), and so on. A suitable form factor for a mobile device 22 is a smart phone, a tablet, a personal digital assistant (PDA), a laptop computer, etc. which is equipped with a touch screen or similar interface for user input/output (I/O).

It should be understood that user authentication to unlock access to the set of computerized resources may performed completely locally (i.e., entirely within a mobile device 22), or involve the remote authentication server 24 (i.e., where at least a portion of the authentication process involves the remote authentication server 24). Along these lines, various forms of authentication are suitable for use including providing a password, a personal identification number (PIN), a passcode, multi-factor authentication, biometric authentication, risk-based authentication, adaptive authentication, knowledge-based authentication, other forms of verification, combinations thereof, and so on.

Similarly, determination of the amounts of time that the mobile devices 22 must be inactive before the mobile devices 22 re-lock access to the computerized resources may be performed entirely locally, or may involve the remote authentication server 24. In particular, the operation of selecting a particular amount of time to use as an inactivity threshold (i.e., the amount of time that the computerize resource must remain inactive before the mobile device 22 re-locks access) may be performed within the mobile device 22 itself or remotely (e.g., by the remote authentication server 24, by a remote protected resource server 26, etc.).

The remote authentication server 24 is constructed and arranged to remotely authenticate users of the mobile devices 22 as needed. The remote authentication server 24 may communicate directly with mobile devices 22, or indirectly with the mobile devices 22 (e.g., when a remote protected resource server 26 requires authentication of a user requesting or attempting access via a mobile device 22).

The set of remote protected resource servers 26 represent external electronic equipment which may communicate with the mobile devices 22 and/or the remote authentication server 24. Each remote protected resource server 26 is capable of providing, to a user 30, access to one or more computerized resources.

The communications medium 28 is constructed and arranged to connect the various components of the electronic environment 20 together to enable these components to exchange electronic signals 32 (e.g., see the double arrow 32). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the users 30 of the mobile devices 22 authenticate in order to access computerized resources using their mobile devices 22. In particular, a user 30 provides a set of authentication factors which is evaluated to determine whether that user 30 is authentic or a fraudster. By way of example, the set of authentication factors includes a password which is entered via a user screen. Other authentication factors may be used in addition to a password or in place of the password such as biometrics, cookies, one-time passcodes (OTPs), personal identification numbers (PINs), and so on. Moreover, as mentioned earlier, other forms of authentication may be included or substituted such as knowledge based authentication (KBA), risk-based or adaptive authentication to authenticate based on measures of risk, multi-factor authentication, combinations thereof, and so on.

Additionally, the computerized resources may reside locally on the mobile devices 22 themselves (e.g., access to locally installed apps, data, network environments, etc.). Also, such computerized resources may reside remotely on one or more remote protected resource servers 26 (e.g., access to remote apps, remote data, remote environments, etc.). Suitable computerized resources include user screen access, phone access, camera access, wireless network access, content (e.g., documents, files, email, database entries, movies, music, other types of visual and/or audio media, general information, games, etc.), services (e.g., banking transactions, securities trading, online ordering and purchasing, etc.), VPN access, application access, permissions and/or privileges, encryption, other accessible computerized resources, combinations thereof, and so on.

It should be understood that each mobile device 22 is equipped with timer circuitry that is started once a user 30 successfully authenticates (e.g., by correctly entering a password) to unlock access to a computerized resource. Once the timer circuitry of a mobile device 22 is started, the timer circuitry counts from an initial value to a predetermined timeout value to impose a timeout period (e.g., five minutes, 10 minutes, etc.).

As will be explained in further detail shortly, selection of a particular timeout period is based on a set of environmental factors obtained from the surrounding environment (or setting) within which the mobile device 22 currently resides. Once the timer circuitry for a computerized resource is started and while the timer circuitry continues to count toward the predetermined timeout value, the mobile device 22 allows the user 30 to access the computerized resource. Furthermore, when the user 30 accesses the computerized resource (i.e., user activity), the timer circuitry resets to the initial value. However, once the timer circuitry reaches the predetermined timeout value due to inactivity, the mobile device 22 re-locks access to the computerized resource and, to regain access to the computerized resource, the user 30 re-authenticates.

For example, suppose that the computerized resource is a user screen of a mobile device 22. After the user 30 successfully authenticates, the user 30 is able to access various mobile device features via the user screen and the timer circuitry of the mobile device 22 starts counting toward the predetermined timeout value. Each time the user screen detects user activity (e.g., in response to the user 30 entering a user gesture), the timer circuitry responds by resetting to the initial value.

However, if the timer circuitry of the mobile device 22 reaches the predetermined timeout value due to a span of user inactivity, the mobile device 22 re-locks access to the computerized resource. For example, the user 30 may have neglected to explicitly logout and instead simply put the mobile device 22 down in an unattended state. Fortunately, the mobile device 22 re-locks the computerized resource after an inactivity time that is commensurate with the current setting. At this point, the user 30 must re-authenticate to regain access to the computerized resource.

It should be understood that, in some arrangements, the timer circuitry counts up from zero to a predefined amount (i.e., the timer circuitry increments a counter). In other arrangements, the timer circuitry counts down from a predefined amount to zero (i.e., the timer circuitry decrements a counter). Other timer/counting mechanisms which are able to measure current inactivity time and compare that current inactivity time to a selected inactivity time are suitable for use as well.

In some arrangements, a single timer imposes a common timeout period to control access to multiple computerized resources on a singled mobile device 22. That is, there is one-to-many access control (e.g., a user screen which controls access to multiple apps, services, components, etc.).

In other arrangements, multiple dedicated timers impose multiple timeout periods to control access to multiple computerized resources on a singled mobile device 22. That is, there is one-to-one access control (e.g., a first timer that controls access to a first computerized resource on a mobile device 22, a second timer that controls access to a second computerized resource on the same mobile device 22, and so on).

In yet other arrangements, there is both one-to-one access control as well as one-to-many access control on the same mobile device 22. Such access control over particular computerized resources of a mobile device 22 is flexible and customizable by the authorized user 30 for that mobile device 22. Further details will now be provided with reference to FIG. 2.

Figure 2:
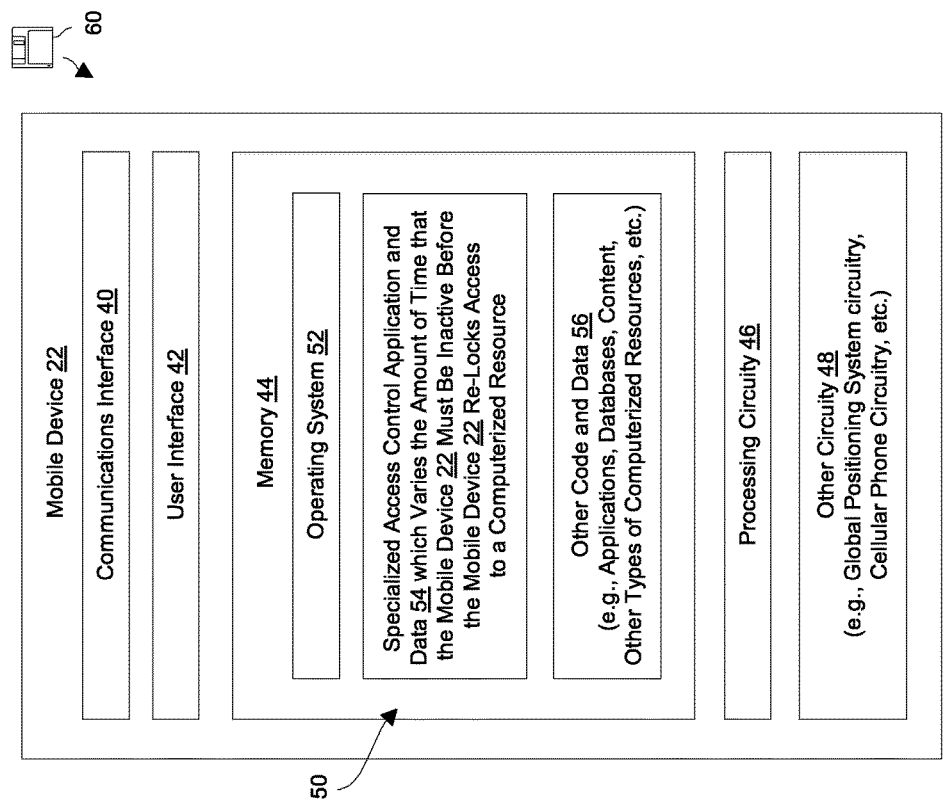
FIG. 2 is a block diagram of a mobile device of FIG. 1.

FIG. 2 shows particular details of a mobile device 22 of the electronic environment 20. The mobile device 22 (e.g., a smart phone, a tablet, a PDA, etc.) includes a communications interface 40, a user interface 42, memory 44, processing circuitry 46, and other circuitry 48.

The communications interface 40 is constructed and arranged to connect the mobile device 22 to the communications medium 28 (also see FIG. 1). Accordingly, the communications interface 40 enables the mobile device 22 to communicate with the other components of the electronic environment 20. Such communications may be cable-based or wireless (i.e., IP-based, SAN-based, cellular, Bluetooth, combinations thereof, and so on).

The user interface 42 is constructed and arranged to receive input from a user 30 and provide output to the user 30. In some arrangements, the user interface 74 is formed by one or more specialized components such as a touch screen, a miniature keyboard, a microphone, a speaker, a camera, and so on.

The memory 44 is intended to represent both volatile storage (e.g., DRAM, SRAM, etc.) and non-volatile storage (e.g., flash memory, magnetic disk drives, etc.). The memory 44 stores a variety of software constructs 50 including an operating system 52, a specialized access control application and data 54, and other code/data 56.

The processing circuitry 46 is constructed and arranged to operate in accordance with the various software constructs 50 stored in the memory 44. In particular, the processing circuitry 46, when executing the operating system 52, manages various parts of the mobile device 22 (e.g., memory allocation, processor cycles, etc.). Additionally, the processing circuitry 46, when executing the specialized access control application and data 54, forms specialized circuitry which control computerized resource access (e.g., the specialized circuitry restarts a timer which imposes a selected inactivity time limit before re-locking access to a computerized resource). Furthermore, the other code and data 56 represents various types of information/resources such as other applications (or apps), databases, content, utilities, parameters, combinations thereof, and other types of computerized resources, etc.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the mobile device 22. The computer program product 60 has a non-transitory and non-volatile computer readable medium which stores a set of instructions to control one or more operations of the mobile device 22. Examples of suitable computer readable storage media include tangible articles of manufacture and apparatus which store instructions in a non-volatile manner such as CD-ROM, flash memory, disk memory, tape memory, and the like.

The other circuitry 48 represents additional specialized componentry of the mobile device 22. Examples of such componentry include global positioning system (GPS) circuitry, cellular phone circuitry, and other circuitry which is typical of a portable apparatus. Further details will now be provided with reference to FIG. 3.

Figure 3:
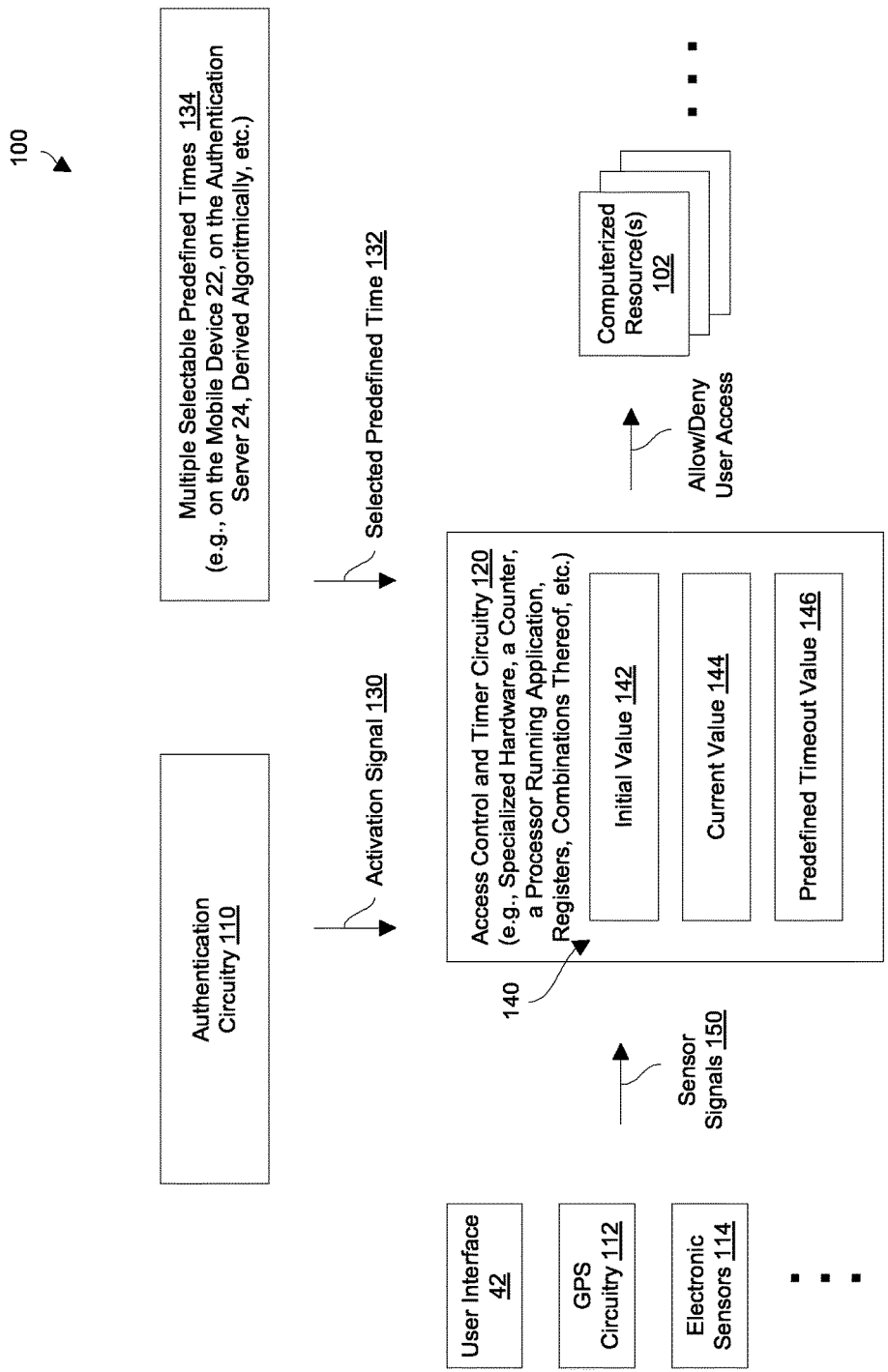
FIG. 3 is a block diagram of particular components of the mobile device of FIG. 2 which are involved in varying the amount of time that the mobile device must be inactive before re-locking access to a computerized resource.

FIG. 3 is a block diagram of particular components 100 of a mobile device 22 that are involved in controlling access to a computerized resource 102 such as a user screen, an application, a service, a smart phone feature, etc. The particular components 100 include authentication circuitry 110, the user interface 42, GPS circuitry 112, other electronic sensors circuitry 114, and access control and timer circuitry 120, among other things. At least some of the components 100 such as the access control and timer circuitry 120 may be formed by specialized hardware, a counter, a processor running an application, registers, memory, combinations thereof, and so on (also see FIG. 2).

During operation, the authentication circuitry 110 performs an authentication operation to determine whether a user 30 is legitimate or a fraudster. Such operation may performed entirely locally (e.g., exclusively within the mobile device 22) or involve communication with the remote authentication server 26 (also see FIG. 1). Along these lines, authentication may involve comparing a current set of authentication factors and/or user behavior obtained from the user 30 to an expected set of authentication factors and/or a user profile. If the authentication circuitry 110 considers the user 30 to be authentic, the authentication circuitry 110 provides an activation signal 130 to the access control and timer circuitry 120 to activate (or enable) the access control and timer circuitry 120.

In response to the activation signal 130 from the authentication circuitry 110, the access control and timer circuitry 120 unlocks a set of computerized resources 102 (i.e., one or more computerized resources 102) that required successful authentication prior to access. At this time, the access control and timer circuitry 120 obtains a predefined time 132 from multiple selectable predefined times 134 based on a sensed set of environmental factors, and starts a timer which utilizes a set of timer values 140 that includes an initial value 142, a current value 144, and a predefined timeout value 146. In some arrangements, the multiple selectable predefined times 134 are stored locally within the mobile device 22 (e.g., see the specialized access control application and data 54 in FIG. 2). In other arrangements, the multiple selectable predefined times 134 are stored remotely (e.g., see the remote authentication server 24, and the remote protected resources 26 in FIG. 1).

Once the access control and timer circuitry 120 allows access to the set of computerized resources 102 and starts the timer, the timer is configured to expire when it reaches the predefined time 132 by counting from the initial value 142 to the predefined timeout value 146 and then re-lock access to the set of computerized resources 102 upon expiration. However, until timer expiration (or until the user explicitly closes/locks the set of computerized resources 102), the access control and timer circuitry 120 permits the user 30 to access the set of computerized resources 102.

To start the timer, the access control and timer circuitry 120 first sets the current value 144 equal to the initial value 142 (e.g., zero). The access control and timer circuitry 120 then counts (e.g., increments) the current value 144 toward the predefined timeout value 146. If the current value 144 reaches the predefined timeout value 146 (i.e., if the timer expires), the access control and timer circuitry 120 re-locks the set of computerized resources 102. While the set of computerized resources 102 is locked, the access control and timer circuitry 120 prohibits the user 30 from accessing the set of computerized resources 102.

During such operation, the access control and timer circuitry 120 may reset the current value 144 to the initial value 142 from time to time in response to detected user activity. For example, each time the user provides input to the user screen, the access control and timer circuitry 120 may reset the timer for re-locking the user screen back to the initial value 142.

Additionally, the access control and timer circuitry 120 periodically re-assesses whether to adjust the selected predefined time 132 based on a newly sensed set of environmental factors. In particular, the access control and timer circuitry 120 selects a particular predefined time 132 among multiple selectable predefined times 134 based on a level of trust associated with the current external environment.

For example, suppose that the access control and timer circuitry 120 initially sets the timer to expire after 10 minutes of inactivity due to sensing an initial set of environmental factors. Then, during a periodic re-assessment operation (e.g., every minute, every two minutes, etc.), the access control and timer circuitry 120 senses a new set of environmental factors. If there is no change in the environment, the access control and timer circuitry 120 maintains the expiration time limit (e.g., to 10 minutes). However, if the mobile device 22 has moved to a less trusted environment (based on the new set of environmental factors), the access control and timer circuitry 120 shortens the expiration time (e.g., to five minutes). Alternatively, if the mobile device 22 has moved to a more trusted environment (based on the new set of environmental factors), the access control and timer circuitry 120 lengthens the expiration time (e.g., to 30 minutes), and so on.

It should be understood that updating the expiration time higher or lower is independent of the process of monitoring user inactivity. In particular, the access control and timer circuitry 120 continues to monitor user inactivity (i.e., count while the computerized resource is inactive, reset in response to detected user activity, etc.) even if or while the expiration time is adjusted.

If the access control and timer circuitry 120 shortens the expiration time limit, the user may need to re-authenticate more frequently due to being locked out from the computerized resource 102 more frequently. However, such operation is beneficial to the user in that the mobile device 22 automatically shortened the expiration time limit because the mobile device 22 moved to a less trusted environment.

In contrast, if the access control and timer circuitry 120 lengthens the expiration time limit, the user may need to re-authenticate less frequently due to being locked out from the computerized resource 102 less frequently. Again, such operation is beneficial to the user in that the mobile device 22 automatically lengthened the expiration time limit because the mobile device 22 moved to a more trusted environment.

During some user sessions, the user 30 may roam back and forth between more trusted and less trusted environments while access the computerized resource. During such a user session, the access control and timer circuitry 120 may adjust the expiration time limit up and down, etc. in response to where the user 30 roams. Accordingly, the access control and timer circuitry 120 effectively adapts the expiration time limit in an automatic and transparent manner.

Example environmental factors for basing the expiration time limit include geolocation sensed by global positioning system (GPS) circuitry, sensed presence of familiar electronic devices in the vicinity of the mobile device such as recognized wireless Ethernet networks and Bluetooth devices, sensed user biometrics such as voice and/or facial scans, sensed audio such as recognized music and/or background noise levels, familiar pattern recognition, sensed smells when odor detection circuitry is available, and so on. Moreover, such environmental factors can be assessed in combination with other factors such as time of day, day of the week, user behavior, and so on to richly and robustly adjust the expiration time limit. Further details will now be provided with reference to FIG. 4.

Figure 4:
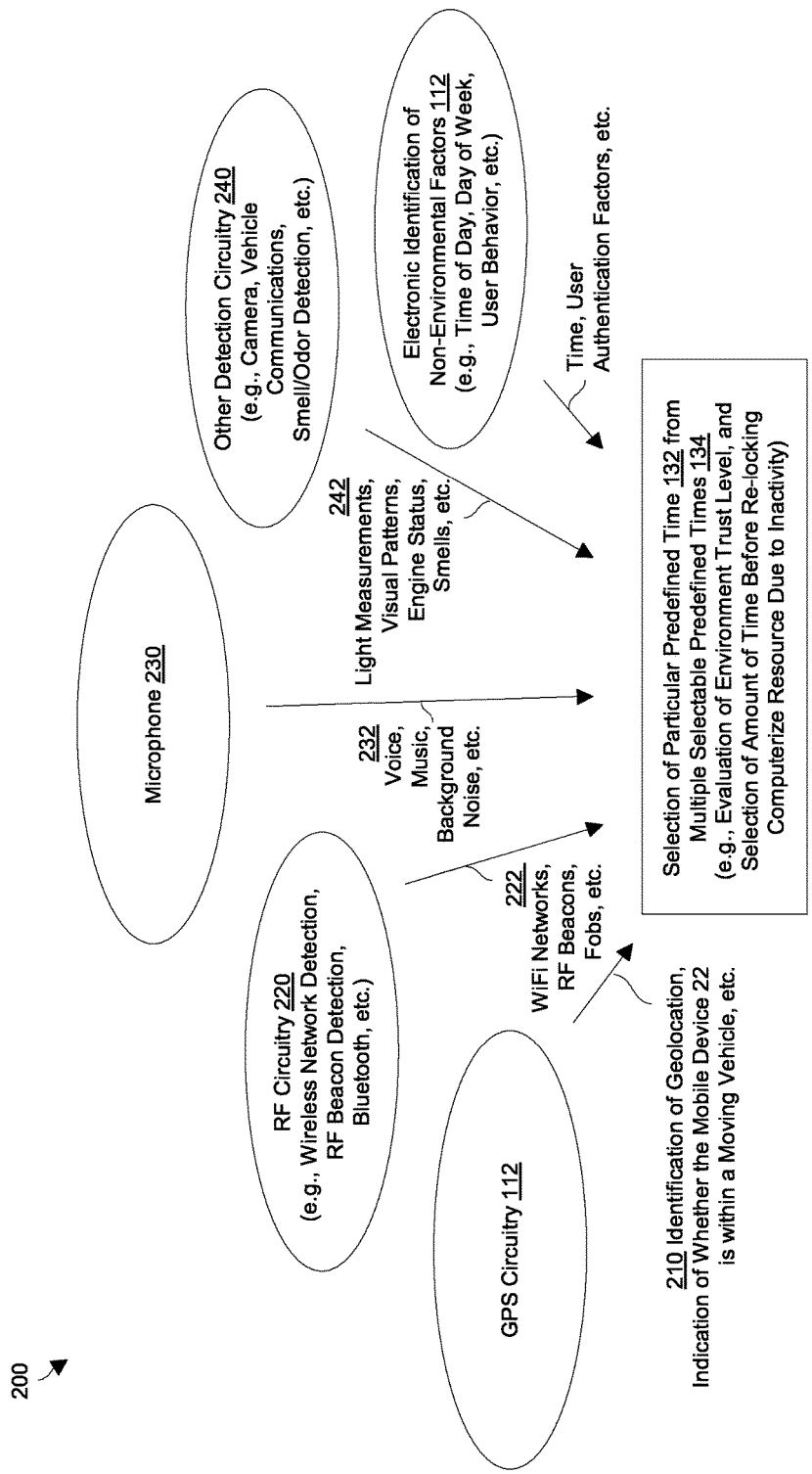
FIG. 4 shows a current environment within which the mobile device of FIG. 2 resides and particular sensing features available to the mobile device.

FIG. 4 shows a current environment (or setting) 200 within which a mobile device 22 resides. When a computerized resource of the mobile device 22 is unlocked for user access, a set of environmental factors of the current environment 200 is sensed by a set of sensing circuits of the mobile device 22 and is used as input by the access control and timer circuitry 120 of the mobile device 22 to select a particular predefined time 132 from multiple selectable predefined times 134 (also see FIG. 3). Such environmental sensing may be part of the user authentication process itself or performed independently (e.g., solely for user inactivity threshold selection). When sensing is part of the user authentication process, at least some of the sensed factors that are used for authentication are further used (simultaneously) to choose a predefined time 132.

Once the access control and timer circuitry 120 selects a predefined time 132, the access control and timer circuitry 120 uses the predefined time 132 as a user inactivity threshold for controlling access to the computerized resource 102. That is, if the access control and timer circuitry 120 detects that the computerized resource 102 is inactive for the particular predefined time 132, the access control and timer circuitry 120 re-locks access to the computerized resource 102 to safeguard the computerized resource 102.

Once the computerized resource 102 is unlocked, the access control and timer circuitry 120 routinely re-performs sensing and selection of a new predefined time 132 for the user inactivity threshold in case the mobile device 22 is moved from one location to another. In particular, the access control and timer circuitry 120 may increase the user inactivity threshold if the mobile device 22 moves to a safer location. Additionally, the access control and timer circuitry 120 may decrease the user inactivity threshold if the mobile device 22 moves to a less safe location.

Such re-sensing of the environment may be performed periodically (e.g., every minute, every two minutes, etc.). Such re-sensing may be event driven (e.g., in response to user activity, in response to performing a particular operation using the computerized resource 102, etc.). In some arrangements, re-sensing is performed periodically and in response to particular events.

It should be understood that the sensing circuits shown in FIG. 4 are provided by way of example only. Other sensing circuits are suitable of use as well.

As shown in FIG. 4, the GPS circuitry 112 provides a geolocation signal 210 which is useful in identifying a current geolocation of the mobile device 22, as well as indicating whether the mobile device 22 is in motion. When the mobile device 22 resides in a trustworthy geolocation (e.g., the legitimate user's home, the legitimate user's office, etc.), the mobile device 22 is in a relatively safe environment and the access control and timer circuitry 120 may select a relatively long predefined time 132 as the user inactivity threshold. However, when the mobile device 22 resides in an untrustworthy geolocation (e.g., a known public location, an unrecognized location, etc.), the mobile device 22 is in a relatively unsafe environment and the access control and timer circuitry 120 may select a relatively short predefined time 132 as the user inactivity threshold.

Additionally, the RF circuitry 220 of the mobile device 22 provides a detection signal 222 which lists detected wireless elements that are within range of the mobile device. Such wireless elements may include detected wireless networks, RF beacons, Bluetooth devices, and so on. When the RF circuitry 220 detects one or more familiar wireless elements, the access control and timer circuitry 120 considers the environment to be less risky. For example, the mobile device 22 may be in the vicinity of the user's home wireless router, the user's office, a fob that the user 30 physically carries, a wireless network of the user's car, and so on. On the other hand, when the RF circuitry 220 does not detect any familiar wireless elements, the access control and timer circuitry 120 considers the environment to be more risky since it is likely that the mobile device 22 is in an unfamiliar location.

Furthermore, the microphone 230 of the mobile device 22 provides an audio signal 232 which can be analyzed by the access control and timer circuitry 120 to identify an amount of risk. Such an audio detection signal 232 may identify the legitimate user's voice, familiar music that is commonly listened to by the legitimate user, a common background noise or a common noise level, and so on. When the access control and timer circuitry 120 recognizes a familiar signature in the audio signal 232 that is associated with the legitimate user, the control and timer circuitry 120 considers the environment to be less risky. On the other hand, when the access control and timer circuitry 120 does not recognize any familiar signature in the audio signal 232 that is associated with the legitimate user, the access control and timer circuitry 120 considers the environment to be more risky since it is likely that the mobile device 22 is in an unfamiliar location and/or the user 30 is not within range of the microphone 230.

It should be understood that other detection circuitry 240 can be accessed by the access control and timer circuitry 120 to identify an amount of risk. For example, a camera of the mobile device 22 is capable of measuring ambient lighting conditions which may indicate that the mobile device 22 is in a familiar location. Additionally, the access control and timer circuitry 120 can perform pattern recognition on camera images to determine whether the mobile device 22 is near a familiar human, a familiar structure, and so on. Furthermore, the mobile device 22 may be able to leverage off of other external circuitry such as a vehicle's computer (e.g., increase/decrease the inactivity threshold based on whether the vehicle's engine is running, the speed of the vehicle, etc.), smell detection circuitry to detect the presence of familiar smells/odors, and so on.

Also, it should be understood that the access control and timer circuitry 120 may include other non-environmental factors when choosing the user inactivity threshold. Examples of non-environmental factors include the current time of day, the current day of the week, user behavior such as typing speed and recognized touch screen gestures, other user authentication factors, and so on.

In some arrangements, for a particular set of sensed environmental factors, the access control and timer circuitry 120 generates an individual timer weight for each environmental factor, tallies the individual timer weights to form an aggregated timer weight, and selects a predefined time 132 based on the aggregated timer weight. In other arrangements, the access control and timer circuitry 120 selects a predefined time 132 based on a worst case environmental factor with the set of environmental factors (i.e., the environmental factor indicating the highest risk). Other selection schemes are suitable for use as well. Further details will now be provided with reference to FIG. 5.

Figure 5:
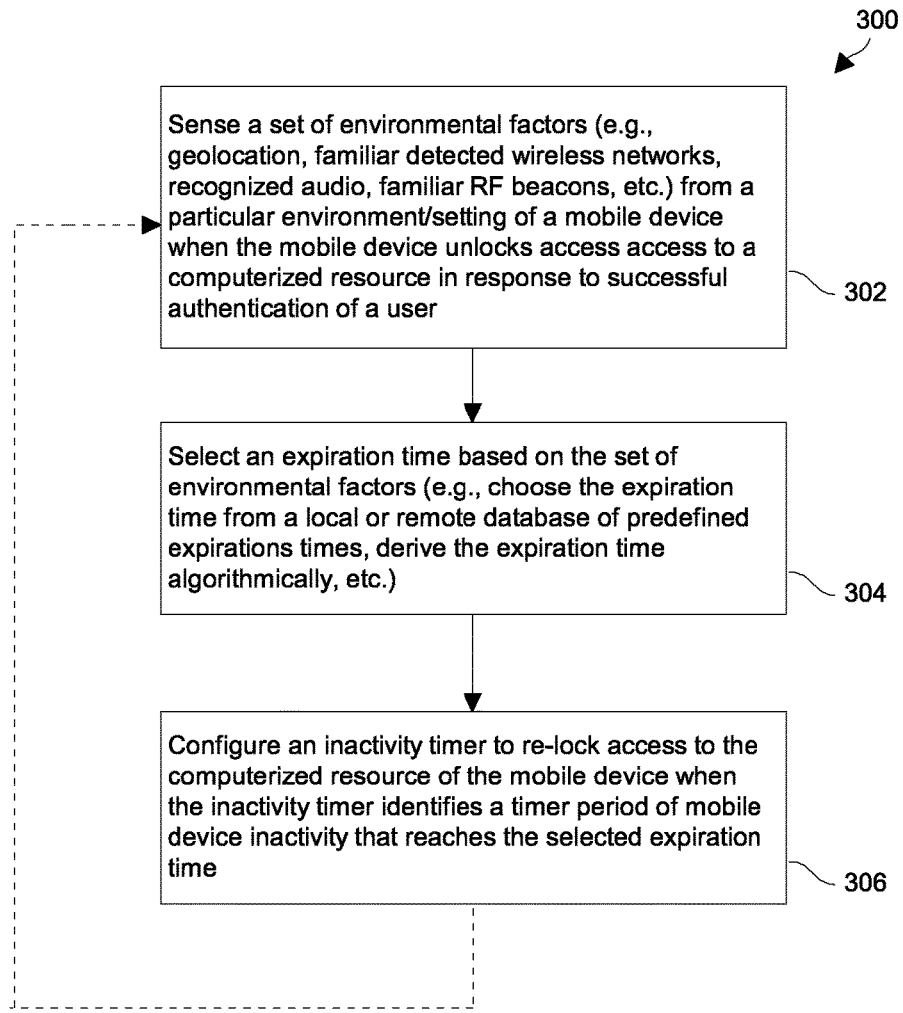
FIG. 5 is a flowchart of a procedure which is performed by the mobile device of FIG. 2.

FIG. 5 is a flowchart of a procedure 300 which is performed by circuitry of a mobile device 22 to control access to a computerized resource. At 302, the mobile device 22 senses a set of environmental factors from a particular environment of the mobile device when the mobile device 22 unlocks the computerized resource in response to successful authentication of a user 30. The set of environmental factors may include geolocation, familiar detected wireless networks, recognized audio, familiar RF beacons, and so on.

At 304, the mobile device 22 selects an expiration time based on the set of environmental factors. In particular, a database of predefined expirations times may reside locally within the mobile device 22 or remotely in an external server for retrieval by the mobile device 22. In some arrangements, the expiration time is calculated algorithmically based on the set of environmental factors. Other suitable alternatives include deriving the expiration time using a formula, applying a policy, combinations thereof, and so on.

At 306, the mobile device 22 configures an inactivity timer to re-lock access to the computerized resource of the mobile device 22 when the inactivity timer identifies a time period of mobile device inactivity that reaches the selected expiration time. That is, the mobile device 22 re-locks the computerized resource upon timer expiration.

The procedure 300 is repeated (e.g., periodically, in response to events, etc.) as shown by the dashed line. Accordingly, the mobile device 22 is able to automatically and transparently adjust the expiration time as the user 30 changes location.

Since the expiration time is selected when the computerized resource is initially unlocked as well as routinely while the user continues to access the computerized resource, the mobile device 22 is able to adapt the expiration time as the user 30 moves among environments that have different levels of trust. Accordingly, the computerized resource is safeguarded based on riskiness of the current environment, and the mobile device 22 provides customized ease of use by not overburdening the user 30 with unnecessary re-authentication.

As mentioned above, improved techniques are directed to varying the amount of time a mobile device 22 must be inactive before the mobile device 22 re-locks access to a computerized resource 102. In particular, selection of this amount of time is based on a set of environmental factors sensed from an environment (or setting) 200 of the mobile device 22. Along these lines, the mobile device 22 may allow for a relatively long time period of inactivity before re-locking if the mobile device 22 is in a highly trusted environment 200 (e.g., in the authorized user's home at night, on the authorized user's desk during work hours, etc.). Additionally, the mobile device 22 may allow for a relatively short time period of inactivity before re-locking if the mobile device 22 is in an unsafe environment 200 (e.g., in an unrecognized public setting, in a moving vehicle of an unknown geolocation, etc.). Such operation enables the mobile device 22 to automatically and transparently adapt the inactivity time period so that the computerized resource 102 is protected and the authorized user 30 is not unnecessarily burdened.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the remote authentication server 24 and the protected resource servers 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that humans with smart phones may be conventionally authenticated based at least in part on an authentication factor such as geolocation, voice recognition, etc. However, such smart phones "de-authenticate" based on static time-outs (for example 10 minutes of inactivity) or explicit "logout".

In connection with authentication (or verification), conventional systems struggle trying to balance rates of false positives and false negatives. A false positive is when the authentication system determines that the human endeavoring to use the smart phone is an authorized person, when the reality is that the human is not the presumed authorized person, thereby leading to security violations in the use of the smart phone. Conversely, a false negative is when the authentication system determines that the human endeavoring to use the smart phone is not an authorized person, when the reality is that the human is in fact authorized thereby leading to inconvenience, and possibly denial-of-service for the human.

To a degree, false positives and false negatives are inversely correlated. One can decrease the number of false positives by increasing the number of false negatives and conversely. Thus, there is a tradeoff between false positives and false negatives. Conventionally, designers of such authentication systems may need to find ways to balance false positives and false negatives, based on real-world experience based data, the perceived security risks as well as preferences of the administrators and/or the users. For example, the designers of such authentication systems might provide a "slider" to set the balance to tradeoff between false positives and false negatives.

However, the drawback of such an approach is that regardless of the balance, there will be false positives and false negatives, thereby potentially compromising the security or usability of the authentication system. Additionally, although the designer may choose to balance the risk between false positives and false negatives, the sum of false positives and false negatives can be substantial. For example, if the designer wants to make the authentication system more secure, the designer can focus on minimizing false positives, which would make the authentication system more conservative in allowing a person to be authenticated by the environment, thereby reducing the ease-of-use to the user.

In contrast to conventional authentication systems, at least some of the improved techniques disclosed herein focus on using environmental information for de-authentication as opposed to authentication. That is, users 30 may authenticate in the usual way (e.g., via a password, a PIN, biometrics, etc). At this point, it is considered "almost certain" that the authenticated user 30 is the person the user 30 claims to be, i.e., the rate of false-positive is negligible.

However, in contrast to a traditional approach of using a static timer to timeout access to a computerized resource, the improved techniques enable automatic de-authentication based on a customized timer. One should appreciate that this adaptable timer is more effective because the duration of a conventional static timer is merely a crude "one-size fits all" estimate of the risk. That is, the longer the period of non-activity, the more likely it is that the person using the device at the end of the period of non-activity is a different person than the one that was authenticated.

To better understand, call this risk "R(t)", namely the risk that after "t" seconds (or minutes) of inactivity, the person who next uses the device is a different person than the person who initially authenticated. The timeout period is selected to keep the risk R(timeout-period) to be less than some desired threshold.

Clearly, that risk R(t) is different depending on the environment. There are many examples such as:
1. If the device is in the person's home (or other private location), then the risk R(t) is lower than if the device is in a public place such as a restaurant or airport waiting room.
2. If the device is physically near the original authenticating person, then the risk R(t) is lower than if the device is not physically near the original authenticating person.
3. If the device is in motion (as detected by a GPS) along a travel route that is common for the authenticating person (for example the daily commute path) than the risk R(t) is lower than if the device is somewhere else.

4. If the device is inside the vehicle of the original authenticating person, then the risk R(t) is lower than if the device is in some other vehicle.
5. If the music being played in the environment is music that is commonly played by the original authenticating person, then the risk R(t) is lower than if some other music is playing.
6. If another environmental factor has similar correlations (e.g., smell detectors, air detectors, etc. to detect the presence of certain chemicals), then the risk R(t) is lower.

In addition, combinations of these environmental characteristics may be more robust than individual characteristics. This means, that different timeout periods for de-authentication in different environments.

An estimate of the risk R(t) can be used to change the timeout period. For example, if the device is in the person's home, then we may have a longer timeout period than if the device is in a public place. Moreover, environmental based security can be used to estimate this risk.

As explained in connection with certain arrangements, environmental indicators determine when to de-authenticate, as opposed (or in addition to) using the environmental indicators to determine when to authenticate. This results in systems/devices that are simultaneously both more secure and easier to use.

In a typical case, this may involve the user authenticating in the usual way. This is to minimize the incidence of false-positives, which risk the security of the device. However, such improved de-authentication effectively limits the number of times the user has to re-authenticate. For example, while the device is at home, the timeout period may be set to 24 hours, and thus the user would possibly never have to re-login, except when the user leaves the house for an extended period. In contrast, if the device is in a public place, the user would have to re-login after a short amount of inactive time (e.g., five minutes, 10 minutes, etc.). Such operation leads to greater user convenience.

Some environmental indicators can be very specific to the individual user. An example is knowing the typical whereabouts of the user. For example, the mobile device may have collected information when the user is at home, at work during work hours or at a cafe every Sunday morning. The mobile device (perhaps with involvement of remote circuitry) then correlates this "profile" of the user with the current environmental (perhaps including day of week and time of day) to determine when the mobile device should de-authenticate and require re-authentication.

As another example, a time-of-day indicator may be correlated to data that shows when the user typically uses the device. For example, if the user rarely uses the device between midnight and 8 AM, then the mobile device can either automatically de-authenticate every midnight, or alternatively just de-authenticate if someone tries to use the system between midnight and 8 AM, i.e. treat the person using the system between midnight and 8 AM as a change in environment that then triggers a de-authentication. If nobody uses the system between midnight and 8 AM (and the mobile device is in the authenticated person's home), then we might de-authenticate them just once a week. Accordingly, such de-authentication is either triggered by an event (an attempted use during odd hours) or suppressed by such an event not occurring during that period of time.

Additionally, although the above-provided examples discuss mobile devices, it should be understood that the techniques disclosed herein are suitable for non-mobile (i.e., stationary) devices as well. Examples of suitable non-mobile devices include desktop computers, user terminals, smart televisions, and the like.

For example, suppose that a stationary electronic device detects that a user has logged in. As long as the stationary electronic device senses that the user is in the room, the stationary electronic device does not log the user out. However, as soon as the stationary electronic device senses that the user has left the room, the stationary electronic device can start a timer to logout the user after a particular time period (e.g., 10 minutes). If the user re-enters the room before that time period expires, the stationary electronic device cancels the timer.

In another example, suppose that a mobile device detects that it is in a public place. In such a situation, the mobile device applies one set of rules. However, if the mobile device later detects that it is now in a private place, the mobile device applies a different set of rules. For example, if in the last few days, different users logged in (e.g., John, Mary, Robert, Sally, etc.) then the device would detect that it resides in a public place and log people off quickly (i.e. short timeouts). However, during a later time period, the device may determine that it now resides in a private location (e.g., a single user logs in at consistent times). Other indicators may include GPS (e.g., are we at the train station or in a home?), wireless network detection (e.g., how many different WiFi signals are around (e.g., public places often have more WiFi signals around), noise levels, and so on.

Moreover, in some arrangements, the device is able to parse noises/sounds. For example, if the device hears/distinguishes only a few different human voices (e.g. five or less), the device may assume that it is in a home. Alternatively, if the device identifies more than a few different human voices (e.g., more than five), the device may conclude that it is in a public setting and thus apply a different timeout period.

One should appreciate that, in some family home settings, the device may sense and recognize one or two adult voices routinely (e.g., from the parents) and other children voices routinely (e.g., from the kids). However, if the pattern of voices detected by the device then changes (e.g., the device detects constantly changing voices), then the device can conclude that the device is in a different environment. For example, the device may have moved, or the device may be in the same place (such as a private home) but at the moment there may be guests around who are not usually there. In this example, the timeout may be reset to a shorter time until there is a prolonged period in which only the family who lives there is detected. Such modifications and enhancements are intended to belong to various embodiments of the disclosure.

What is claimed is:

1. A method of controlling access to a computerized resource of a mobile device, the method comprising:
   sensing, by processing circuitry, a set of environmental factors from a particular environment of the mobile device when the mobile device unlocks the computerized resource in response to successful authentication of a user, wherein sensing the set of environmental factors includes detecting, via a microphone of the mobile device, whether the mobile device is in a vicinity of a familiar audio source;
   selecting, by the processing circuitry, an expiration time based on the set of environmental factors, at least in part by choosing a relatively longer particular predefined time as the selected expiration time in response to the set of environmental factors indicating that the particular environment is a trusted environment and choosing a relatively shorter particular predefined time as the selected expiration time in response to the set of environmental factors indicating that the particular environment is not a trusted environment, and wherein the set of environmental factors indicate that the particular environment is a trusted environment when the mobile device is in a vicinity of the familiar audio source; and configuring, by the processing circuitry, an inactivity timer to re-lock access to the computerized resource of the mobile device when the inactivity timer identifies a time period of mobile device inactivity that reaches the selected expiration time.

2. A method as in claim 1 wherein selecting the expiration time based on the set of environmental factors includes:

choosing, as the selected expiration time, a particular predefined time from multiple selectable predefined times.

3. A method as in claim 2 wherein configuring the inactivity timer to re-lock access to the computerized resource includes:

starting the inactivity timer;

wherein the inactivity timer, upon being started, (i) counts from an initial value to a predefined timeout value as a measure of a current amount of inactivity time, and (ii) provides a re-lock signal when the inactivity timer reaches the predefined timeout value.

4. A method as in claim 3, further comprising:

resetting the inactivity timer to the initial value to restart the inactivity timer in response to user activity detected by the mobile device.

5. A method as in claim 3, further comprising:

receiving the re-lock signal from the inactivity timer in response to the inactivity timer reaching the predefined timeout value, and re-locking access to the computerized resource in response to the re-lock signal.

6. A method as in claim 3, further comprising:

after the inactivity timer is started and before the inactivity timer reaches the predefined timeout value, sensing a new set of environmental factors from a new environment of the mobile device, and selecting a new expiration time based on the new set of environmental factors; and re-configuring the inactivity timer to re-lock access to the computerized resource of the mobile device when the inactivity timer reaches a new predefined timeout value corresponding to the new expiration time.

7. A method as in claim 6 wherein selecting the new expiration time based on the new set of environmental factors includes:

choosing, as the new expiration time, a new predefined time from the multiple selectable predefined times, the new predefined time being different from the particular predefined time;

wherein re-configuring the inactivity timer to re-lock access to the computerized resource includes:

directing the inactivity timer to measure the new expiration time in place of the selected expiration time and then re-starting the inactivity timer.

8. A method as in claim 7, further comprising:

after the inactivity timer is restarted, detecting new user activity and re-starting the inactivity timer in response to the new user activity, receiving the re-lock signal from the inactivity timer in response to the inactivity timer measuring a time period of mobile device inactivity that reaches the new expiration time, and re-locking access to the computerized resource in response to the re-lock signal.

9. A method as in claim 7 wherein choosing the new predefined time includes:

selecting, as the new predefined time, a time that is longer than the particular predefined time based on the new set of environmental factors indicating that the new environment is more trusted than the particular environment.

10. A method as in claim 7 wherein choosing the new predefined time includes:

selecting, as the new predefined time, a time that is shorter than the particular predefined time based on the new set of environmental factors indicating that the new environment is less trusted than the particular environment.

11. A method as in claim 7 wherein sensing the new set of environmental factors from the new environment of the mobile device includes:

detecting that the mobile device is within a predefined range of a previously recognized external element.

12. A method as in claim 11 wherein detecting that the mobile device is within range of the previously recognized external element includes:

detecting, via a wireless interface of the mobile device, that the mobile device is in range of an authorized wireless network.

13. A method as in claim 11 wherein detecting that the mobile device is within range of the previously recognized external element includes:

detecting, via global positioning system (GPS) circuitry of the mobile device, that the mobile device is in motion.

14. A method as in claim 11 wherein detecting that the mobile device is within range of the previously recognized external element includes:

detecting, via global positioning system (GPS) circuitry of the mobile device, that the mobile device is in a particular location.

15. A method as in claim 11 wherein detecting that the mobile device is within range of the previously recognized external element includes:

detecting, via radio frequency (RF) circuitry of the mobile device, that the mobile device is a predefined vicinity of an RF beacon.

16. A method as in claim 11 wherein detecting that the mobile device is within range of the previously recognized external element includes:

detecting, via a microphone of the mobile device, that the mobile device is in a vicinity of the familiar audio source.

17. A method as in claim 11 wherein selecting the new expiration time based on the new set of environmental factors includes:

choosing the new expiration time from an expiration time database stored in memory of the mobile device, the new expiration time being chosen based on (i) detected presence of the previously recognized external element within the new environment and (ii) a current time reading.

18. A method as in claim 11 wherein selecting the new expiration time based on the new set of environmental factors includes:

choosing the new expiration time from an expiration time database stored in memory of the mobile device, the new expiration time being chosen based on (i) detected presence of the previously recognized external element within the new environment and (ii) a current set of transparently sensed user authentication factors obtained from the user.

19. An electronic apparatus, comprising:

memory; and control circuitry coupled to the memory, the memory storing instructions which, when carried out by the control circuitry, cause the control circuitry to:
- sense a set of environmental factors from a particular environment of a mobile device when the mobile device unlocks a computerized resource in response to successful authentication of a user, at least in part by detecting, via a microphone of the mobile device, whether the mobile device is in a vicinity of a familiar audio source;
- select an expiration time based on the set of environmental factors, at least in part by choosing a relatively longer particular predefined time as the selected expiration time in response to the set of environmental factors indicating that the particular environment is a trusted environment and choosing a relatively shorter particular predefined time as the selected expiration time in response to the set of environmental factors indicating that the particular environment is not a trusted environment, and wherein the set of environmental factors indicate that the particular environment is a trusted environment when the mobile device is in a vicinity of the familiar audio source; and
- configure an inactivity timer to re-lock access to the computerized resource of the mobile device when the inactivity timer identifies a time period of mobile device inactivity that reaches the selected expiration time.

20. A computer program product having a non-transitory computer readable medium which stores a set of instructions to control access to a computerized resource of a mobile device; the set of instructions, when carried out by computerized circuitry, causing the computerized circuitry to perform a method of:
- sensing a set of environmental factors from a particular environment of a mobile device when the mobile device unlocks a computerized resource in response to successful authentication of a user, wherein sensing the set of environmental factors includes detecting, via a microphone of the mobile device, whether the mobile device is in a vicinity of a familiar audio source;
- selecting an expiration time based on the set of environmental factors, at least in part by choosing a relatively longer particular predefined time as the selected expiration time in response to the set of environmental factors indicating that the particular environment is a trusted environment and choosing a relatively shorter particular predefined time as the selected expiration time in response to the set of environmental factors indicating that the particular environment is not a trusted environment, and wherein the set of environmental factors indicate that the particular environment is a trusted environment when the mobile device is in a vicinity of the familiar audio source; and
- configuring an inactivity timer to re-lock access to the computerized resource of the mobile device when the inactivity timer identifies a time period of mobile device inactivity that reaches the selected expiration time.

* * * * *